United States Patent
Zhang et al.

(10) Patent No.: US 10,216,690 B2
(45) Date of Patent: Feb. 26, 2019

(54) SINGLE-WIRE INTERFACE BUS TRANSCEIVER SYSTEM BASED ON I2C-BUS, AND ASSOCIATED METHOD FOR COMMUNICATION OF SINGLE-WIRE INTERFACE BUS

(71) Applicant: NXP B.V., Eindhoven (NL)

(72) Inventors: Hongyun Zhang, Shanghai (CN); Jian Qing, Shanghai (CN); Zhongmeng Chen, Shanghai (CN)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/301,871

(22) PCT Filed: Apr. 9, 2015

(86) PCT No.: PCT/EP2015/057662
§ 371 (c)(1),
(2) Date: Oct. 4, 2016

(87) PCT Pub. No.: WO2015/155266
PCT Pub. Date: Oct. 15, 2015

(65) Prior Publication Data
US 2017/0024354 A1    Jan. 26, 2017

(30) Foreign Application Priority Data

Apr. 9, 2014    (CN) .......................... 2014 1 0140410

(51) Int. Cl.
*G06F 13/00*    (2006.01)
*G06F 13/42*    (2006.01)
(Continued)

(52) U.S. Cl.
CPC ........ *G06F 13/4291* (2013.01); *G06F 13/364* (2013.01); *G06F 13/404* (2013.01); *G06F 13/4295* (2013.01); *G06F 13/387* (2013.01)

(58) Field of Classification Search
CPC .......................... G06F 13/387; G06F 13/4291
See application file for complete search history.

(56) References Cited

U.S. PATENT DOCUMENTS

| | | | |
|---|---|---|---|
| 5,007,050 A | * | 4/1991 | Kasparian ................ H04B 1/56 370/280 |
| 5,604,918 A | | 2/1997 | Huijsing et al. |

(Continued)

FOREIGN PATENT DOCUMENTS

| CN | 1514547 A | 7/2004 |
|---|---|---|
| CN | 102375998 A | 3/2012 |
| CN | 102752065 A | 10/2012 |

OTHER PUBLICATIONS

International Search Report for counterpart application PCT/EP2015/057622; 12 pages (dated Jul. 3, 2015).

*Primary Examiner* — Zachary K Huson

(57) ABSTRACT

There is disclosed a single-wire Interface bus transceiver system comprising: an I2C master, a master transceiver, a signal wire, a slave transceiver and an I2C slave, wherein the master transceiver is adapted to encode master data SDA and master clock SCL received from I2C master using Manchester code, generate master single wire signal and transfer it to the slave transceiver through the signal wire, the master transceiver is also adapted to decode Manchester-encoded slave signal received from the signal wire and transfer the decoded slave data to I2C master; the slave transceiver is adapted to encode slave data received from I2C slave using Manchester code, generate slave single wire signal and transfer it to the master transceiver through the signal wire, the slave transceiver is also adapted to decode Manchester-encoded master signal received from the signal wire, generate the recovered master clock and transfer the decoded master data and recovered master clock to I2C slave.

8 Claims, 3 Drawing Sheets

(51) Int. Cl.
*G06F 13/364* (2006.01)
*G06F 13/40* (2006.01)
G06F 13/38 (2006.01)

(56) References Cited

U.S. PATENT DOCUMENTS

| | | |
|---|---|---|
| 6,968,472 B2 | 11/2005 | Fernald |
| 7,694,039 B2 * | 4/2010 | Zhang .................... H04L 25/40 |
| | | 710/105 |
| 8,161,224 B2 | 4/2012 | Laurencin et al. |
| 8,230,151 B2 | 7/2012 | Hou et al. |
| 2010/0017553 A1 * | 1/2010 | Laurencin ........... G06F 13/4027 |
| | | 710/307 |
| 2010/0183004 A1 | 7/2010 | Kobayashi |
| 2011/0293035 A1 | 12/2011 | Kobayashi |
| 2012/0032789 A1 | 2/2012 | Ichimaru et al. |
| 2013/0124763 A1 | 5/2013 | Kessler |
| 2014/0025999 A1 * | 1/2014 | Kessler ............... G06F 13/4295 |
| | | 714/43 |

\* cited by examiner

SINGLE-WIRE INTERFACE BUS TRANSCEIVER SYSTEM BASED ON I2C-BUS, AND ASSOCIATED METHOD FOR COMMUNICATION OF SINGLE-WIRE INTERFACE BUS

BACKGROUND

This invention relates to single-wire Interface bus based on I2C-bus.

Traditional I2C-bus communication needs two-wire, which may not be suitable for long-distance cable in industrial applications. It may result in noise and ground offsets in the popular I2C-bus electronic design.

SUMMARY

The present disclosure comprises methods and apparatus as defined in the independent claims.

According to one aspect of the present disclosure, there is provided a single-wire Interface bus transceiver system comprising: an I2C master, a master transceiver, a signal wire, a slave transceiver and an I2C slave, wherein the master transceiver is adapted to encode master data SDA and master clock SCL received from I2C master using Manchester code, generate master single wire signal and transfer it to the slave transceiver through the signal wire, the master transceiver is also adapted to decode Manchester-encoded slave signal received from the signal wire and transfer the decoded slave data to I2C master; the slave transceiver is adapted to encode slave data received from I2C slave using Manchester code, generate slave single wire signal and transfer it to the master transceiver through the signal wire, the slave transceiver is also adapted to decode Manchester-encoded master signal received from the signal wire, generate the recovered master clock and transfer the decoded master data and recovered master clock to I2C slave.

By providing a single-wire Interface bus transceiver which mixes clock into data line, it may be possible to reduce noise and ground offsets, and may be fully compatible to I2C protocol.

According to another aspect of the present disclosure, there is provided a single-wire Interface bus master transceiver comprising: a master encode clock generator adapted to receive system clock of master transceiver and master clock, generate master encoding clock through sampling the master clock by system clock of master transceiver; a master Manchester encoder adapted to encode the received master encoding clock and master data using Manchester code, generate master single wire signal and output it; a master clock recovery adapted to recover slave clock according to the system clock and slave single wire signal; and a master Manchester decoder adapted to decode the slave single wire signal and output the decoded slave data.

In one or more embodiments, alternatively and without limitation, the master Manchester encoder is further adapted to generate I2C master clock prolong control.

According to another aspect of the present disclosure, there is provided a single-wire Interface bus slave transceiver comprising: a slave clock recovery adapted to generate slave encoding clock according to master single wire signal received from the I2C master, and generate the recovered master clock; a master Manchester encoder adapted to encode the received master encoding clock and master data using Manchester code, generate master single wire signal and output it; a master Manchester decoder adapted to decode the master single wire signal and generate master data; and a master I2C timing sequence generator adapted to ensure the recovered master clock and decoded master data satisfy with I2C standard timing sequence requirement.

According to another aspect of the present disclosure, there is provided a method for communication of single-wire Interface bus from I2C master to I2C slave, comprising: transmitting master data and master clock; encoding the master data and master clock using Manchester code, and generating master single wire signal; transferring the master single wire signal; decoding the master single wire signal.

According to another aspect of the present disclosure, there is provided a method for communication of single-wire Interface bus from I2C slave to I2C master, comprising: transmitting slave data; encoding the slave data using Manchester code, and generating slave single wire signal; transferring the slave single wire signal; decoding the slave single wire signal.

In one or more embodiments, alternatively and without limitation, the Manchester code is Manchester-II Bi-phase code.

DETAILED DESCRIPTION

Figure 1:
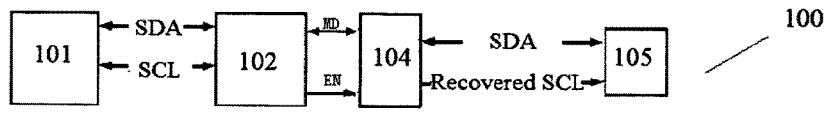
FIG. 1 shows a single-wire Interface bus transceiver system according to one or more embodiments.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments.

FIG. 1 shows a single-wire Interface bus transceiver system 100 according to one or more embodiments. The single-wire Interface bus transceiver system comprises an I2C master 101, a master transceiver 102, a signal wire 103, a slave transceiver 104 and an I2C slave 105.

The I2C master 101 and the master transceiver 102 transfer data SDA and master clock SCL to each other. Master clock SCL is bus clock. The master transceiver 102 can encode master data SDA and master clock SCL received from the I2C master 101 using Manchester code, generate master single wire signal (MD) and transfer it to the signal wire 103; the master transceiver 102 can also decode Manchester-encoded slave single wire signal (MD) received from the signal wire 103 and transfer the decoded slave data to the I2C master 101.

The signal wire 103 can transfer the master single wire signal received from the master transceiver 102 to the slave transceiver 104; the signal wire 103 can also transfer the slave single wire signal received from the slave transceiver 104 to the master transceiver 102.

I2C slave 105 and the slave transceiver 104 transfer data to each other. The slave transceiver 104 can encode slave data received from I2C slave 105 using Manchester code, generate slave single wire signal and transfer it to the signal wire 103, the slave transceiver 104 can also decode Manchester-encoded master signal received from the signal wire 103, generate the recovered master clock and transfer the decoded master data and recovered master clock to I2C slave 105.

Figure 2:
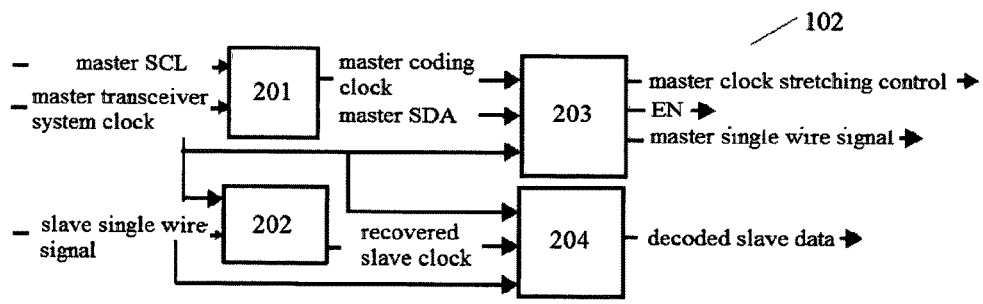
FIG. 2 shows a master transceiver according to one or more embodiments.
Figure 3:
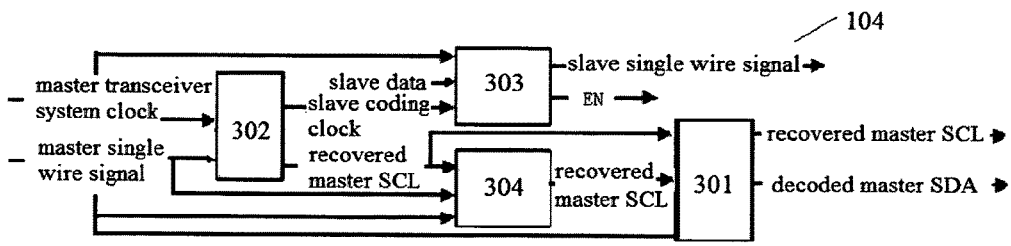
FIG. 3 shows a slave transceiver according to one or more embodiments.

The structure of master transceiver 102 and slave transceiver 104 in single-wire Interface bus transceiver system according to one or more embodiments are shown in FIG. 2 and FIG. 3 as below.

FIG. 2 shows a master transceiver 102 according to one or more embodiments. Master transceiver 102 comprises a master encode clock generator 201, master clock recovery 202, and master Manchester encoder 203 and decoder 204.

The master encode clock generator 201 can receive system clock of master transceiver and master clock, generate master encoding clock by sampling the I2C master clock. The frequency of the master encoding clock is twice that of the master clock. The master Manchester encoder 203 can encode the received master encoding clock and master data using Manchester code, generate master single wire signal and output it, and generate I2C master clock stretching control. The clock stretching control is used to postpone the transmission of master data when the master data has been transferred and the Manchester coding has not been done. The Manchester encoder 203 may generate EN signal which is used to control the transmission direction of the single-wire interface bus transceiver system 100. The Manchester encoded master single wire signal is generated by the master encode clock generator 201 and the master Manchester encoder 203. The master single wire signal is transferred to the slave transceiver 104 through signal wire, so that the I2C master 101 and slave 105 can communicate with each other.

The master clock recovery 202 can sample the slave single wire signal and recover slave clock according to the system clock and slave single wire signal, in order to synchronize the master transceiver and slave transceiver system clock. The master Manchester decoder 204 can receive the Manchester encoded slave single wire signal, the recovered slave clock, master transceiver system clock, decode the slave single wire signal and output the decoded slave data. The Manchester encoded slave single wire signal is transferred to the master transceiver 102 through the signal wire 103. The master decoder 204 can decode the slave single wire signal, generates decoded I2C slave data and transfers it to I2C master 101.

Alternatively, the system clock of both master transceiver 102 and slaver transceiver 104 have a frequency 13 times that of the maser clock. It can make the recovered clock more accurate and the bit error ration lower.

FIG. 3 shows a slave transceiver 104 according to one or more embodiments. The slave transceiver 104 comprises a master I2C timing sequence generator 301, a slave clock recovery 302, a master Manchester encoder 303, and a master Manchester decoder 304.

The slave clock recovery 302 can generate slave encoding clock which has a frequency twice that of the master clock according to master single wire signal received from the I2C master, and generate the recovered master clock. The master Manchester encoder 303 can receive slave transceiver system clock, I2C slave data SDA and slave coded clock, encode the received master encoding clock and master data using Manchester code, generate master single wire signal and transfer it to the master transceiver 102 through signal wire, so that the I2C master 101 and slave 105 can communicate with each other.

The master Manchester decoder 303 can receive slave transceiver system clock, recovered master clock and master single wire signal, decode the master single wire signal and generate master data. The master I2C timing sequence generator 301 can receive slave transceiver system clock, recovered master clock and decoded master data, buffer the decoded master data to ensure the recovered master clock and decoded master data satisfy with I2C standard timing sequence requirement, i.e. the master data sent to the I2C slave and master clock satisfy the I2C standard timing requirement. The Manchester encoded master single wire signal is generated. The master single wire signal is transferred to the slave transceiver 104 through the signal wire. The slave decoder 304 can decode the master single wire signal, generates decoded I2C master data and recovered master clock and transfer them to the I2C timing sequence generator 301. The I2C timing sequence generator 301 can transfer the decoded I2C master data and recovered master clock to I2C slave 105.

Figure 4:
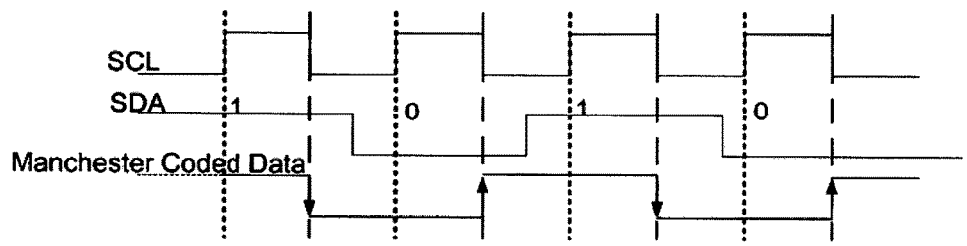
FIG. 4 shows a graph of Manchester encoding.

FIG. 4 shows a graph of Manchester encoding. Alternatively, it uses well-known Manchester II Bi-phase encoding (often also referred to simply as Manchester encoding). Manchester encoding provides a self-clocking waveform that incorporates the data bit sequence. Therefore, it is not a separate clock signal because the clock has been embedded in the data. A logical "1" is a positive pulse followed by a negative pulse, logical "0" is a negative pulse followed by a positive pulse. Encoding the SCL and SDA, the graph is shown as FIG. 4. Manchester coded data "1" is a positive pulse followed by a negative pulse, Manchester coded data "0" is a negative pulse followed by a positive pulse.

FIG. 5-10 illustrate several examples of encoding.

Figure 5:
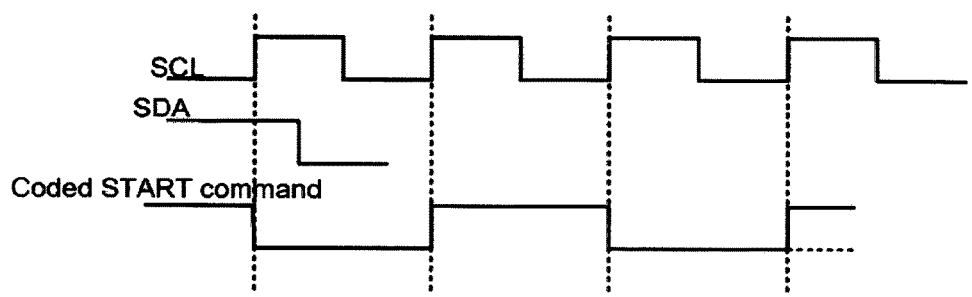
FIG. 5 shows a graph of I2C master START command encoding.

FIG. 5 shows a graph of I2C master START command encoding. The master encoding clock is generated by sampling the I2C master clock SCL. The frequency of the master encoding clock is twice that of the master clock. When SCL is positive pulse and SDA changes from positive pulse to negative pulse, the START command starts. After the START command, SDA can be transferred continually. There is a sync header for slave transceiver 104 and master transceiver 102. Any data transaction between slave and master will start with a sync header which is 1 SCL period low level and 1 SCL period high level. For START command, the code is a sync header and is followed in 1 SCL period low level.

Figure 6:
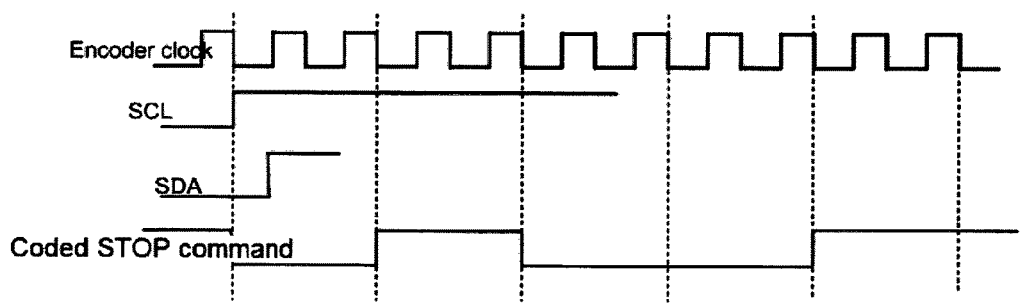
FIG. 6 shows a graph of I2C master STOP command encoding.

FIG. 6 shows a graph of master STOP command encoding. The master encoding clock is generated by sampling the I2C master clock SCL. The frequency of the master encoding clock is twice that of the master clock. When SCL is positive pulse and SDA changed from negative pulse to positive pulse, the STOP command starts. After the STOP command, SDA can be transferred again. There is a sync header for slave transceiver 104 and master transceiver 102. Any data transaction between slave and master will start with a sync header which is 1 SCL period low level and 1 SCL period high level. For I2C STOP command, the code is a sync header and is sequentially followed in 2 SCL periods low level and 1 SCL period high level.

Figure 7:
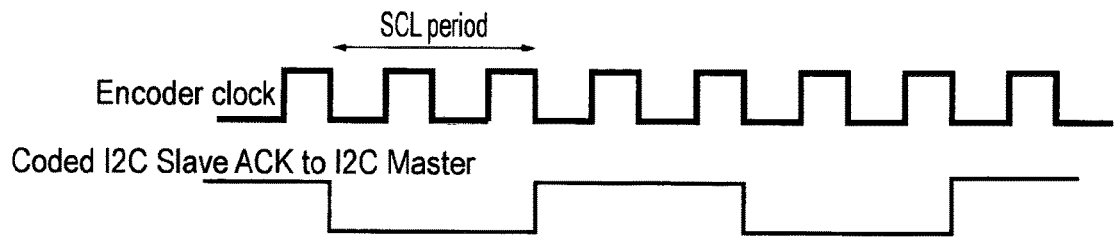
FIG. 7 shows a graph of I2C slave ACK response encoding.

FIG. 7 shows a graph of slave ACK response encoding. For I2C slave ACK response, the code is a sync header and is followed in 1 SCL period low level.

Figure 8:
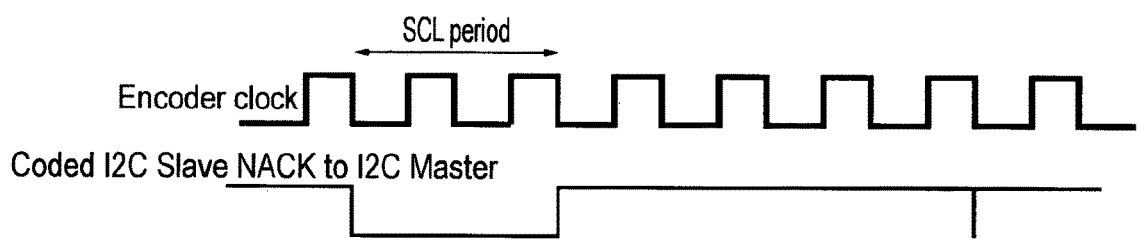
FIG. 8 shows a graph of I2C slave NACK response encoding.

FIG. 8 shows a graph of slave NACK response encoding. For I2C slave NACK response, the code is a sync header and is followed in 1 SCL period high level.

Figure 9:
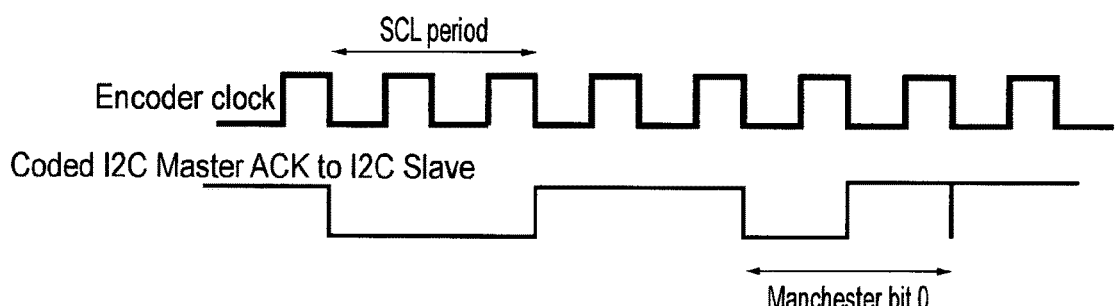
FIG. 9 shows a graph of I2C master ACK response encoding.

FIG. 9 shows a graph of master ACK response encoding. For I2C master ACK response, the code is a sync header and is followed in 1 Manchester data bit 0.

Figure 10:
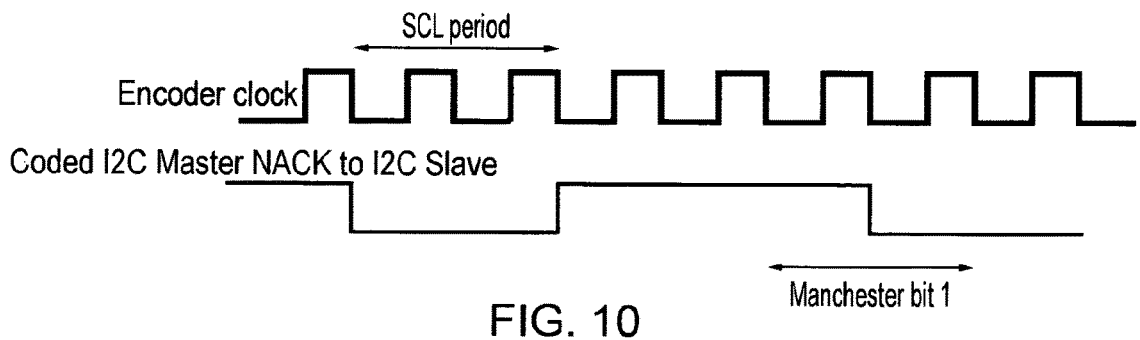
FIG. 10 shows a graph of I2C master NACK response encoding.

FIG. 10 shows a graph of master NACK response. For I2C master NACK response, the code is a sync header and is followed in 1 Manchester data bit 1.

According to another aspect of the present disclosure, there is provided a method for communication of single-wire Interface bus from I2C master to I2C slave, comprising: transmitting master data and master clock; encoding the master data and master clock using Manchester code, and generating master single wire signal; transferring the master single wire signal; decoding the master single wire signal.

According to another aspect of the present disclosure, there is provided a method for communication of single-wire Interface bus from I2C slave to I2C master, comprising: transmitting slave data; encoding the slave data using Manchester code, and generating slave single wire signal; transferring the slave single wire signal; decoding the slave single wire signal.

In one or more embodiments, alternatively and without limitation, the Manchester code is Manchester-II Bi-phase code.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

From reading the present disclosure, other variations and modifications will be apparent to the skilled person. Such variations and modifications may involve equivalent and other features which are already known in the art of I2C bus transceiver, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A single-wire interface bus transceiver system comprising:
an I2C master, a master transceiver, a signal wire, a slave transceiver and an I2C slave, wherein:
the master transceiver is adapted to encode master data SDA and master clock SCL received from the I2C master using Manchester code, generate a Manchester coded master single wire signal and transfer the Manchester encoded master data SDA and master clock SCL of the single wire signal to the slave transceiver through the signal wire;
the master transceiver is also adapted to decode Manchester-encoded slave signal received from the signal wire and transfer the decoded slave data to I2C master;
the slave transceiver is adapted to encode slave data received from I2C slave using Manchester code, generate slave single wire signal and transfer it to the master transceiver through the signal wire; and
the slave transceiver is also adapted to decode Manchester-encoded master signal received from the signal wire, generate the recovered master clock and transfer the decoded master data and recovered master clock to I2C slave.

2. A system as claimed in claim 1, wherein the Manchester code is Manchester-II Bi-phase code.

3. A single-wire interface bus master transceiver comprising:
a master encode clock generator adapted to receive system clock of master data and master clock, generate a master encoding clock through sampling the master clock by a system clock of the master transceiver;
a master Manchester encoder adapted to encode the received master encoding clock and the master data using Manchester code, generate a master single wire signal, and output it;
a master clock recovery adapted to recover a slave clock according to the system clock and a slave single wire signal; and
a master Manchester decoder adapted to decode the slave single wire signal and output the decoded slave data.

4. A transceiver as claimed in claim 3, the master Manchester encoder further adapted to generate I2C master clock stretching control.

5. A single-wire interface bus slave transceiver comprising:
a slave clock recovery adapted to generate a slave encoding clock according to a master single wire signal received from the I2C master, and generate a recovered master clock;
a master Manchester encoder adapted to encode a received master encoding clock and master data using Manchester code, generate a master single wire signal, and output it;
a master Manchester decoder adapted to decode the master single wire signal and generate the master data; and
a master I2C timing sequence generator adapted to ensure the recovered master clock and decoded master data satisfy with an I2C standard timing sequence requirement.

6. A method for communication of single-wire interface bus from an I2C master to an I2C slave, comprising:
transmitting master data and master clock;
encoding the master data and the master clock using Manchester code, and generating a master single wire signal;
transferring the master single wire signal; and
decoding the master single wire signal.

7. A method for communication of single-wire interface bus from an I2C slave to an I2C master, comprising:

transmitting slave data;
encoding the slave data using Manchester code, and generating a slave single wire signal;
transferring the slave single wire signal; and
decoding the slave single wire signal.

8. A method as claimed in claim 6, wherein the Manchester code is Manchester-II Bi-phase code.

\* \* \* \* \*